United States Patent [19]

Isozumi et al.

[11] Patent Number: 4,912,352
[45] Date of Patent: Mar. 27, 1990

[54] ARMATURE OF ELECTRIC MOTOR

[75] Inventors: Shuzoo Isozumi; Tetsuo Yagi, both of Hyogo, Japan

[73] Assignee: Mitsubishi Denki Kabushiki Kaisha, Tokyo, Japan

[21] Appl. No.: 221,567

[22] PCT Filed: Nov. 26, 1987

[86] PCT No.: PCT/JP87/00914
§ 371 Date: Jun. 15, 1988
§ 102(e) Date: Jun. 15, 1988

[87] PCT Pub. No.: WO88/04490
PCT Pub. Date: Jun. 16, 1988

[30] Foreign Application Priority Data

Dec. 9, 1986 [JP] Japan .................. 61-292721

[51] Int. Cl.⁴ .............................................. H02K 13/00
[52] U.S. Cl. ...................................... 310/233; 310/237; 310/236; 29/597
[58] Field of Search ............... 310/233, 234, 235, 237, 310/270, 271; 29/597

[56] References Cited

U.S. PATENT DOCUMENTS

| 2,606,220 | 3/1951 | Labastie | 29/597 |
| 3,290,527 | 10/1964 | Habermann | 310/233 |
| 3,908,265 | 9/1975 | Heil et al. | 29/597 |

FOREIGN PATENT DOCUMENTS

| 48-88903 | 10/1973 | Japan . |
| 49-30721 | 8/1974 | Japan . |
| 50-8005 | 1/1975 | Japan . |
| 50-11924 | 4/1975 | Japan . |

Primary Examiner—Patrick R. Salce
Assistant Examiner—C. LaBalle
Attorney, Agent, or Firm—Sughrue, Mion, Zinn, Macpeak & Seas

[57] ABSTRACT

With respect to an armature for use in an electric motor of an engine starter, or the like, an annular steel-plate ring (11) is fitted on the outer circumference of commutator segments (2) through insulating paper (12) for the purpose of stably maintaining strength in the connection between each of the commutator segments (2) to which armature coils (6) are connected and a resinmolding member (3) fixed to an armature rotary shaft (5).

1 Claim, 2 Drawing Sheets

ARMATURE OF ELECTRIC MOTOR

TECHNICAL FIELD

The present invention relates to an armature of an electric motor for use in an engine starter, or the like, and particularly relates to an improvement in an armature having a face-type commutator.

BACKGROUND TECHNIQUE

FIG. 1 shows a structure of a conventional armature of this kind, in which the reference numeral 1 designates a face-type commutator constituted by disc-like commutator segments 2 and a resin-molding member 3 which is molded so as to engage with the commutator segments 2 by engagement claws 2a of the latter so that the commutator segments 2 and the resin-molding member 3 are integrated with each other. To commutator 1 is fixed to an armature rotary shaft 5 through a bush 4. The refernce numeral 6 designates armature coils inserted and held in slots provided in a core 7. End portions of the coils 6 are inserted in riser grooves 8 of the commutator segments 2 so as to be electrically connected to the commutator segments 2. The core 7 is fixed to the armature rotary shaft 5. The reference numeral 9 designates binding wire wound around the outer circumference of the armature coils 6 through insulating paper 10. The binding wire 9 is provided to prevent the coils 6 from floating up owing to centrifugal force when the armature is rotated.

Upon turning a key switch on in the engine starter using such an armature, a current is caused to flow from brushes (not-shown) which are in contact with the commutator segments 2 into the armature coils 6 through the commutator segments 2 so that rotary force is generated in the armature. The rotary force is transmitted to a ring gear (not shown) of the engine so as to be able to start the engine. Although centrifugal force acts on the armature coils 6 in a direction so as to make the armature coils 6 come off from the commutator segments 2 as the armature is rotated, the armature coils 6 are prevented from floating up by the binding wire 9. Such a conventional armature however has a problem in that when the armature is rotated at a high speed, the centrifugal force acting on the commutator segments 2 is so great that it becomes impossible to keep the commutator segments 2 fixed to the resin-molding member 3 solely by the holding force of the engaging claws 2a thus allowing the commutator segments 2 to come off from the resin-molding member 3 so as not to operate as an armature.

The present invention has been attained to eliminate the problems as described above, and an object thereof is to obtain an armature of an electric motor in which separation of the commutator segments from resin-molding member owing to the centrifugal force can be prevented from occurring.

DISCLOSURE OF THE INVENTION

The present invention is intended to provide an armature in which an annular steel-plate ring is fitted onto the outer circumference of the commutator segments through an insulating paper.

According to the present invention, the steel-plate ring is fitted onto the outer circumference of the commutator segments, so that it becomes possible to suppress centrifugal force acting on the commutator segments when the armature is rotated at a high speed to thereby maintain the connection of the commutator segments to a resin-molding member.

BRIEF DESCRIPTION OF THE INVENTION

DETAILED DESCRIPTION OF THE INVENTION

Figure 1:
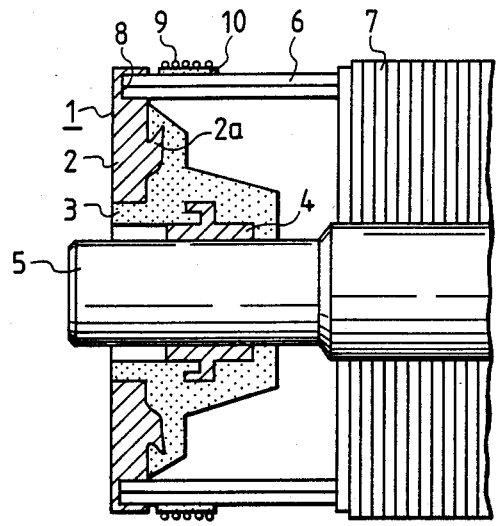
FIG. 1 is a sectional view showing a main portion of a conventional motor armature.
Figure 2:
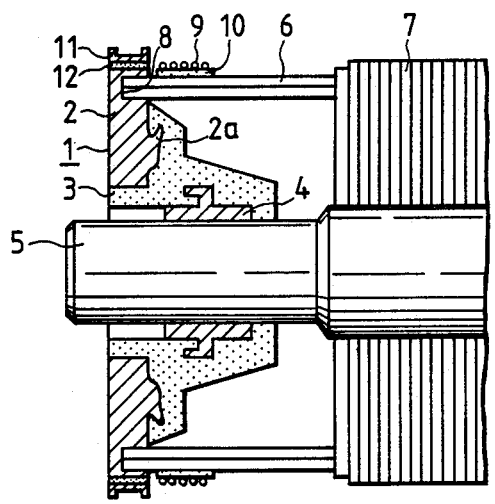
FIG. 2 is a sectional view showing a main portion of an embodiment of the present invention.

Referring to the drawings, embodiments of the present invention will be described hereunder so that the present invention can be understood in more detail. FIG. 2 shows an embodiment of the motor armature according to the present invention. In FIG. 2, the parts corresponding to those in FIG. 1 are correspondingly referenced, and the description of them will be omitted. The reference numeral 11 designates a steel-plate ring formed in an annular shape by stamping a steel-plate. The steel-plate ring 11 is fitted over the outer circumference of the commutator segments 2 through insulating paper 12.

The operation of the engine starter using the armature having such a structure is the same as that of the conventional example described above. Even if centrifugal force acts on the commutator 1 in the case where the armature is rotated at a high speed, the centrifugal force acting on the commutator segments 2 is suppressed because the steel-plate ring 11 is fitted over the outer circumference of the commutator segments 2, so that the defect of the commutator segments 2 coming off of a resin-molding member 3 is eliminated.

Figure 3:
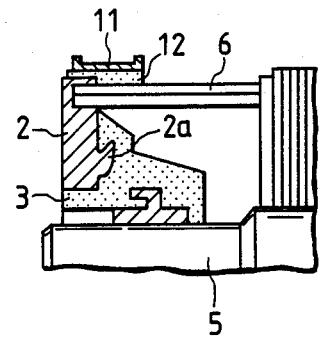
FIGS. 3 and 4 are sectional views showing other embodiments of the present invention.

FIG. 3 shows another embodiment of the present invention, in which a steel-plate ring 11 is axially elongated to extend over the outer circumference of the commutator segments 2 and the outer circumference of armature coils 6, and is fitted onto the commutator segments 2 and the armature coils 6 through insulating paper 12. In such an arrangement, the conventional binding wire becomes unnecessary, and at the same time the influence of centrifugal force on the commutator segments 2 as well as the armature coils 6 is suppressed.

Figure 4:
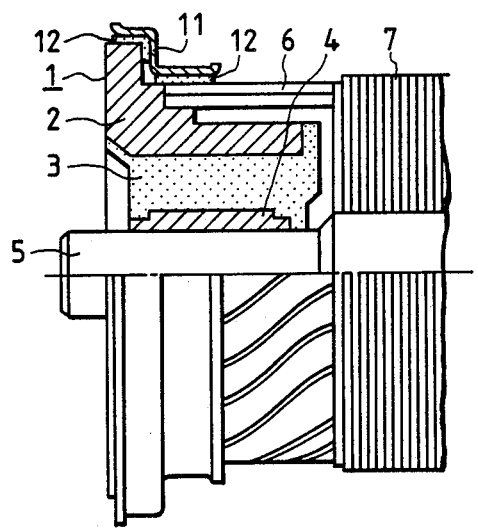

As shown in FIG. 4, in the case where a stage or step-like difference exists between the outer circumference of the commutator segments 2 and the outer circumference of the armature coils 6, it will do to use a modified steel-plate ring 11 which is worked in accordance with the stage difference.

As described above, according to the present invention, an annular steel-plate ring is fitted to the outer circumference of the commutator segments through insulating paper, so that centrifugal force acting on the commutator segments when the armature is rotated at a high speed is suppressed. Accordingly, the commutator segments are prevented of coming off from the resin-molding member, and the connection between the commutator segments and the resin-molding member is maintained stably.

We claim:

1. A motor armature having a resin-molding member supported by an armature rotary shaft through a bush, commutator segments molded integrally with said resin-molding member, and a face-type commutator provided with riser grooves formed at outer circumference portions of said commutator segments to which respective end portions of armature coils are electrically connected, characterized in that an annular steel-plate ring is fitted onto an outer circumferential surface of said commutator through insulating paper in which said steel-plate ring is made to extend over the outer circumference of said commutator segments and an outer circumference of said armature coils adjacent to said segments so as to be fitted thereto, and further wherein said steel-plate ring is formed in a step-like manner including a first annular portion having a first diameter which extends over the outer circumference of said commutator segments, a second annular portion having a second diameter which extends over the outer circumference of said armature coils and an intermediate portion extending between said first and second annular portions.

* * * * *